United States Patent [19]

Gilbreath

[11] Patent Number: 4,630,956
[45] Date of Patent: Dec. 23, 1986

[54] SCAFFOLDING CONNECTION AND RETENTION DEVICE AND METHOD

[75] Inventor: William E. Gilbreath, Huffman, Tex.

[73] Assignee: Safway Scaffolds Company of Houston, Houston, Tex.

[21] Appl. No.: 657,979

[22] Filed: Oct. 5, 1984

[51] Int. Cl.⁴ .......................... E04G 7/00; F16B 1/00; F16B 21/00
[52] U.S. Cl. .................................... 403/49; 403/330; 403/246; 182/178; 411/342; 411/344; 29/453; 29/464
[58] Field of Search ......................... 403/49, 246, 330; 182/178, 179; 411/340-346; 29/453, 464, 468

[56] References Cited

U.S. PATENT DOCUMENTS

| | | |
|---|---|---|
| 196,914 | 11/1877 | Lockwood .......................... 411/343 |
| 462,752 | 11/1891 | Weber . |
| 934,982 | 9/1909 | Nesdall . |
| 1,360,880 | 11/1920 | Buchholtz ......................... 411/340 |
| 2,124,658 | 7/1938 | Smith ................................. 411/341 |
| 2,246,834 | 6/1941 | Bowman ........................... 411/342 |
| 2,318,548 | 5/1943 | Whitehean ...................... 411/345 |
| 2,377,086 | 5/1945 | Lang ................................. 411/344 |
| 2,587,058 | 2/1952 | Melrose . |
| 2,601,802 | 7/1952 | Hanson ............................. 411/343 |
| 2,662,798 | 12/1953 | Kirkpatrick ........................ 403/49 |
| 2,701,167 | 2/1955 | Kirkpatrick ........................ 403/49 |
| 2,847,259 | 8/1958 | Beatty . |
| 2,961,259 | 11/1960 | Heaphy ............................. 403/49 |
| 3,001,252 | 9/1961 | Erickson et al. . |
| 3,091,485 | 5/1963 | Jackson ............................. 403/49 |
| 3,179,212 | 4/1965 | Gostling . |
| 3,241,420 | 3/1966 | Passer ............................... 411/346 |
| 3,434,748 | 3/1969 | Leurent . |
| 3,453,925 | 7/1969 | Peterson . |
| 3,487,744 | 1/1970 | Montana ............................ 411/346 |
| 3,552,257 | 1/1971 | Tanabe . |
| 3,672,710 | 6/1972 | Kroopp . |
| 3,695,649 | 10/1972 | Laverone . |
| 4,140,414 | 2/1979 | Buttgereit . |
| 4,188,143 | 2/1980 | Matsuura .......................... 403/49 |
| 4,348,790 | 9/1982 | Kuramoto . |
| 4,389,135 | 6/1983 | Peters . |
| 4,462,197 | 7/1984 | D'Alessio et al. .................. 403/49 |

FOREIGN PATENT DOCUMENTS

| | | |
|---|---|---|
| 1434490 | 5/1969 | Fed. Rep. of Germany ........ 403/49 |
| 60455 | 9/1949 | France . |
| 91851 | 4/1958 | Norway . |
| 780499 | 8/1957 | United Kingdom ................ 411/341 |

Primary Examiner—Cornelius J. Husar
Assistant Examiner—Todd G. Williams
Attorney, Agent, or Firm—Norvell & Associates

[57] ABSTRACT

Improved apparatus is provided for temporarily securing together scaffolding members. A slotted stud fixed to a scaffolding support member is provided with a pivotal dog rotatable within the slot for receiving the hole punched end of a cross member. A spring and washer having a transverse bar member within the slot are permanently retained on the stud to prevent misuse of the device. Rotation of the dog to receive the cross member causes axial movement to the washer and compression of the spring. Further compression of the spring by the cross member allows the dog to return to its lock position by gravity. The spring, washer, and dog thus cooperate to either expel the cross member from the device or lock the cross member in place, which substantially increases scaffolding safety.

25 Claims, 10 Drawing Figures

SCAFFOLDING CONNECTION AND RETENTION DEVICE AND METHOD

BACKGROUND OF THE INVENTION

Scaffolding generally comprises vertical supports or frame members, bracing or connecting members, and connection and retention devices for temporarily securing together the members to form the desired scaffolding at the job site. The connection and retention device may be mounted to either the vertical support or the bracing member, and the other member may be altered to cooperate with the connection and retention device to secure the members together.

The design of scaffolding, and particularly the design and function of the device utilized for securing together the vertical members and bracing members, presents two frequently conflicting objectives: (1) the design must be safe, not only structurally, but also from the standpoint of minimizing or eliminating operator error in erecting the scaffolding, and (2) the design should be easy for the operator to utilize, thereby not substantially increasing the time or effort required to erect or disassemble the scaffolding.

Various types of scaffolding connectors or joints have obviously been devised, including the wedged-clamp joint described in U.S. Pat. No. 4,140,414, and the transom and spigot construction shown in U.S. Pat. No. 3,179,212. Probably the most popular type of scaffolding connectors employ a stud which generally is welded to and projects from the vertical support, with the bracing supports provided with an aperture for sliding over the stud. U.S. Pat. No. 2,701,167 illustrates such a design, which includes a gravity-responsive latch or dog to temporarily lock the bracing support to the vertical support. U.S. Pat. No. 2,810,612 discloses a hollow stud and an elongated latch pin, and U.S. Pat. No. 2,847,259 discloses a hollow stud with a leaf spring inside the stud biasing the dog in the downward direction. In U.S. Pat. No. 4,188,143, a pivotal member is similarly biased by a leaf spring in the upward position. The background of scaffolding art and particularly devices for temporarily securing together scaffolding members is discussed in these references, Which are each hereby incorporated by reference in their entirety into this application.

One need not be skilled in the scaffolding art to recognize the serious consequences of a scaffolding collapse or failure. Moreover, scaffolding is frequently erected and disassembled by relatively unskilled and inexperienced personnel. Also, scaffolding is frequently used in an environment that favors the accumulation of debris on scaffolding members which further increases the need for a reliable, easily utilized, and most importantly, a safe scaffolding retention device and method. One of the problems with some prior art scaffolding connections, such as that shown in U.S. Pat. No. 4,140,414, is that the connection devices are relatively expensive to manufacture and may be unintentionally misused by personnel erecting scaffolding.

The collapse or failure of scaffolding frequently occurs because the connection between the vertical scaffolding members and the bracing members has not been properly made. Moreover, such an improper connection is generally not easily observed by either the personnel erecting the scaffolding or the personnel utilizing the scaffolding. Thus, a problem exists with the prior art scaffolding in that an improper connection between support members and cross members may be sufficient to temporarily support the scaffolding and personnel, but vibration or other change in conditions suddenly results in the dislodgement of connected members and the collapse of the scaffolding. If, for instance, one of the dog members shown in U.S. Pat. No. 2,701,167 did not easily rotate relative to the stud and were to "freeze" in the up position after the bracing latch had been placed on the stud, the operator erecting the scaffolding may erroneously believe a proper connection had been made. The bracing member may thus be supported by the stud, but since the dog had not fallen properly in place to lock the bracing member to the stud on the vertical member, the bracing member thereafter may vibrate off the stud causing the collapse of the scaffolding. Similarly, the leaf spring shown in U.S. Pat. No. 2,847,259 could break or the dog jam within the hollow stud so as to hold the dog in the horizontal position, and an operator probably would not know that the leaf spring had broken.

The disadvantages of the prior art are overcome by the present invention, and improved apparatus and methods are hereinafter provided for temporarily securing together scaffolding members.

SUMMARY OF THE INVENTION

An improved apparatus is provided for temporarily securing together scaffolding members. A slotted stud may be fixed to a vertical scaffolding support, with a dog pivotally connected to the end of the stud and rotatable within the stud slot. A special washer and spring are permanently retained on the stud, with a transverse bar member of the washer axially movable within the stud slot. The dog, spring, and washer cooperate to lock the bracing member in place or expel the bracing member from the stud.

According to a preferred method of the present invention, rotation of the dog in a position for receiving the bracing member causes axial movement of the washer and compression of the spring. In that position, the dog engages the washer at a point substantially spaced from the axis of the stud, so that the spring and washer apply a force to the stud in a direction substantially spaced from the axis of rotation of the stud, thus tending to return the dog to its normal locked position. Further compression of the spring by the cross member allows the dog to return by gravity to its normal lock position. Thus, the dog spring and washer are utilized to either properly lock the scaffolding members together or expel the bracing member from the stud, so that an operator can readily detect that a proper connection has not been made.

It is a feature of the present invention to provide a device for temporarily connecting scaffolding members which improves the safety of scaffolding.

It is a further feature of the invention to provide a scaffolding connection device which can be easily and quickly utilized to erect and disassemble scaffolding.

It is a further feature of the present invention to provide a scaffolding connection device which cannot be easily tampered to defeat the intended purpose of the device.

It is another feature of the present invention to provide a scaffolding connection device which may be easily utilized with conventional scaffolding members.

Still another feature of the present invention is to provide methods and apparatus for securing scaffolding members which clearly indicates if a proper connection of the scaffolding members has been made.

It is another feature of the present invention to provide an improved method for temporarily securing together scaffolding joints, whereby a bracing member is expelled from the connection if a safe connection has not been made.

These and other features and advantages of the present invention will become apparent from the foregoing description, wherein reference is made to the following drawings.

IN THE DRAWINGS

DETAILED DESCRIPTION OF THE INVENTION

Figure 1:
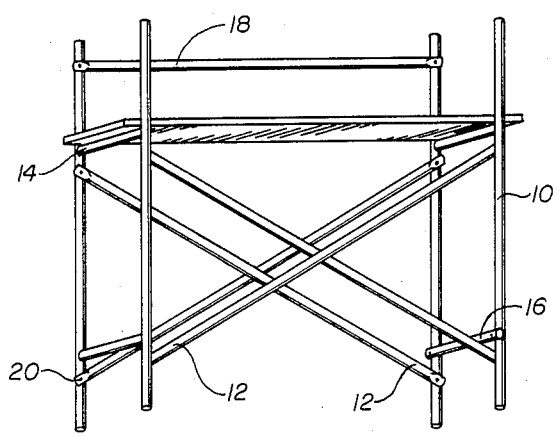
FIG. 1 is a pictorial illustration of a portion of typical scaffolding.

FIG. 1 depicts a portion of scaffolding according to the present invention. The scaffolding comprises elongate vertical support members 10 and bracing members 12, With the bracing members conventionally connected to the support members at the desired jobsite to form the scaffolding. Typically, one or more horizontal member 14 may be welded or otherwise fixed to a pair of vertical supports 10, and the welded assemblies may thus be easily transported to the jobsites with the corresponding bracing members. A retention device according to the present invention is shown generally at 20, and it should be understood that a bracing member generally is adapted at each end for fitting engagement with a suitable retention device. Another horizontal bracing member or guard rail 18 is shown above the work platform, with the guard rail also being secured in place by the retention device according to the present invention. As an alternative to providing horizontal members 14 which are fixed to the supports 10, a horizontal member 16 is illustrated as being connected to the vertical supports by a pair of similar connection members according to the present invention. It should be understood that each of the members 10, 12, 14, 16, and 18 are preferably formed from metal pipe, which is customary to the scaffolding industry.

Figure 2:
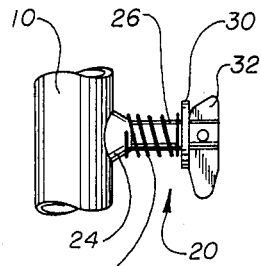
FIG. 2 is a side view of one embodiment according to the present invention.

FIG. 2 illustrates a side view of one embodiment of a connecting device 20 according to the present invention. The retention device 20 includes a stud having a base portion 24 for fixed engagement with the support member 10, and an elongate rod portion 26 having a substantially circular cross-sectional configuration. Thus, a plurality of studs generally protrude from the support members 10, with the central axis of each stud preferably being perpendicular to the axis of its corresponding support member. Each of the studs generally may project inwardly of the scaffolding assembly, as shown in FIG. 1, although if desired the bracing members could be connected outwardly of the supports and the studs could thus project outwardly of the vertical supports. The retention device 20 shown in FIG. 2 is illustrated without a cross member, and is shown to include a dog member 32 which is pivotally mounted to the rod portion 26 of the stud and rotatable within a vertical plane passing through the axis of the stud. The retention device 20 further comprises a washer 30 and a coil spring 28 substantially encompassing at least a portion of the stud and spaced between the support member 10 and the washer 30.

Figure 6:
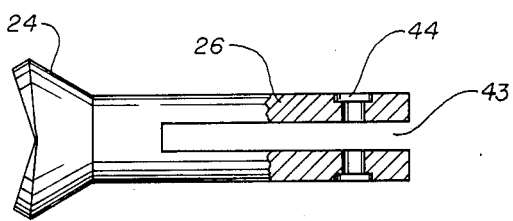
FIG. 6 is a side view, partially in cross-section, of the slotted stud according to the present invention.
Figure 7:
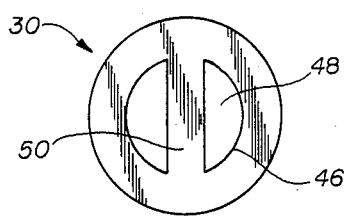
FIG. 7 is a view of the washer show in FIG. 2.

Referring briefly to FIGS. 6 and 7, the elongate rod portion 26 of the stud includes a slot 43, with the stud preferably being fixed to the support member so that the slot 43 appears as a vertical cut through the stud. A substantially horizontal aperture 44 is provided in the stud, so that the dog member 32 can be pivotably connected to the stud by a rivet. As shown in FIG. 7, the washer 30 includes an integral transverse bar member 50 which is adapted for sliding engagement within the slot 43, as discussed hereafter.

Figure 5:
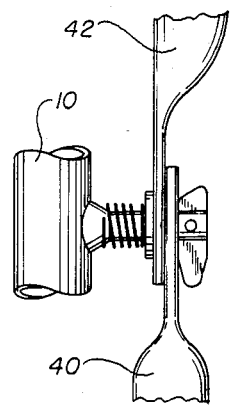
FIG. 5 is a side view of the embodiment shown in FIG. 2 illustrating two bracing members locked in place.
Figure 3:
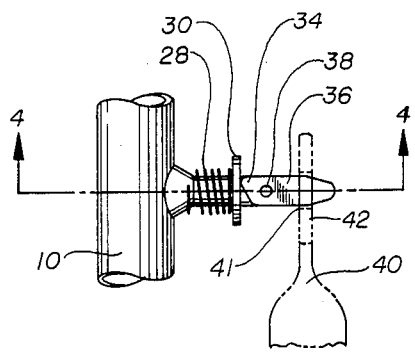
FIG. 3 is a side view of the embodiment shown in FIG. 2 in a position for receiving a bracing member.

Referring now to FIG. 3, it should be understood that the dog 32 is pivotably connected to the stud by rivet 38, and the dog may be rotated to the open position as shown in FIG. 3 for receiving a suitable cross member 40. The cross member 40 is typically provided with a flattened end or paddle end 42 having a circular aperture 41 for sliding onto the stud, and member 40 is conventional in the scaffolding art. Rotation of the dog from the lock position as shown in FIG. 2 to the open position as shown in FIG. 3 causes movement of the washer 30 along the axis of the stud, and compression of the spring 28. The bracing member 40 may be temporarily secured to the support member 10 by bringing the paddle 42 into engagement with the washer 30, and continued movement of the paddle toward the support member will compress the spring 28. Once the bracing member 40 and washer 30 are moved further toward the support member 10 from the position as shown in FIG. 3, the pivotable dog member 32 may automatically return to its lock position by gravity. Upon release, the bracing member will be held in the locked position and will be held in engagement with the dog by the force of the spring 28. It should be understood that one or more bracing member may be temporarily secured to the connection and retention device in the manner described above. As shown in FIG. 5, the retention device may temporarily secure an elongate bracing member 40 having a paddle end generally along the axis of the bracing member, and/or also an elongate member 42 having a paddle end substantially parallel to the outer periphery of the bracing member. Both bracing members shown in FIG. 5 are known in the art and commonly used in the scaffolding industry.

Referring again to FIGS. 6 and 7, the integral transverse bar portion 50 of the washer 40 is adapted for sliding within the slot 43. The preferred length of the stud, or more particularly the preferred depth of the slot 43, may be determined by the maximum number of bracing members to be fitted onto the retention device and the thickness of the bracing member ends. The bracing members need not have flattened ends in order to be utilized with the retention device of the present invention (e.g., bracing member 16 in FIG. 1), provided the bracing member has an aperture so that the bracing member can be fitted onto the open position dog and stud. If the bracing member ends are not flattened, the stud need be longer to provide for a deep slot 43. Preferably, however, the bracing members will have flattened ends, and each stud will be adapted to temporarily secure at least two bracing members to the support member.

The transverse bar portion 50 of the washer 30 slides within the slot 43, and the semi-circular shaped apertures 48 on each side of the bar 50 are adapted for fitting over the corresponding portions of the stud on either side of the slot 43. The inner diameter of the washer 30 is preferably only slightly greater than the external diameter of the rod portion 26 of the stud, so that the washer 30 can move easily in a direction along the axis of the stud, but is otherwise restrained from substantial non-axial movement relative to the axis of the stud.

Figure 8:
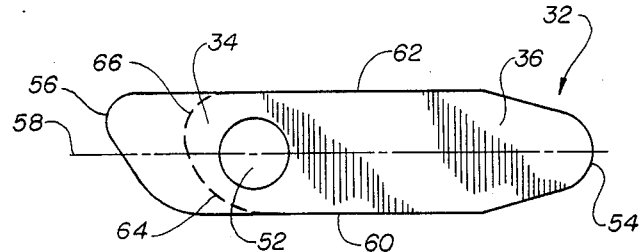
FIG. 8 is a side view of the dog shown in FIG. 2.

Referring to FIGS. 3 and 8, the dog 32 is preferably formed from flat metal stock having a thickness slightly less than the width of the slot 43. The dog 32 includes an aperture 52 for receiving the rivet 38, and a portion 34 (to the left of the aperture 52) for engagement with the washer 30, and a portion 36 (to the right of the aperture 52) for receiving the bracing member. The portion 36 preferably includes a rounded end 54 so that when the dog 32 is rotated to the open position as shown in FIG. 3, the bracing member 40 may be easily placed on the dog and the stud. Also, the portion 36 is preferably heavier than the portion 34, so that the freely pivotable dog 32 will automatically return by gravity to its lock position as shown in FIG. 5.

Figure 4:
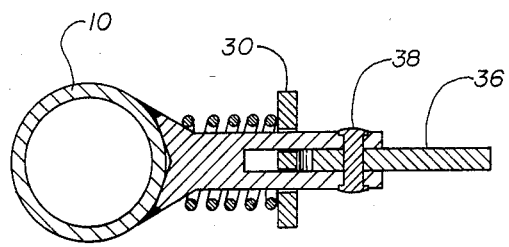
FIG. 4 is a cross-section of the apparatus shown in FIG. 3.

The portion 34 of the dog preferably includes a rounded end 56 for engagement with the washer when the dog is pivoted for receiving the bracing member. As seen in FIGS. 3 and 4, this rounded end 56 engages the washer at a point (or a line) substantially spaced above the axis of the stud. Thus, when the dog 32 is positioned as shown in FIG. 3, the biasing means 28 through the washer 30 creates a force on the dog tending to return the dog to its lock position. This biasing force thus acts upon the dog in the same rotational direction as gravity (as shown in FIG. 3, in a clockwise rotational direction), and the biasing means and gravity preferably cooperate to cause a rotational force to return the dog to its locked position. It may be desirable that the retention device not enable an operator to turn the dog 180° from the position as shown in FIG. 3, so that the bracing member receiving portion 36 would be in engagement with the washer while the washer engagement portion 34 was aligned to receive the bracing member. This condition can be prevented, however, by providing a dog having greater spacing between the aperture 52 and end 54 than the depth of the slot 43 in the stud.

When constructing a connection and retention device according to the present invention, the spring and washer are first fitted over the stud, and the dog then riveted in place. Thereafter, a plurality of such assemblies may be welded at desired locations to the support members 10. It should be understood that the transverse bar member of the washer and the pivotable dog prevent an operator from removing the spring and washer from the retention device, thereby preventing misuse of the device. Also, each component of the present invention is readily visible, so that persons erecting scaffolding can easily detect damage to any component of the retention device and persons utilizing the scaffolding. Excessive damage to the components of the retention device 20 is unlikely, however, because each component may be easily fabricated from rugged stock. Also, each part of the connection and retention device is readily accessible for cleaning, and the operation of the device will not likely be affected by debris to the extent common to other retention devices.

The operation of erecting and disassembling scaffolding using the retention device according to the present invention will now be briefly described. Initially, the retention device would be in the locked position as shown in FIG. 2, with the spring 28 exerting an axially-direct force on the washer 30 so that the washer is in forced engagement with the surface 60 of the dog. With one hand, the operator may rotate the dog 32 in a counter clockwise direction, thus moving the washer 30 in a direction along the axis of the stud toward the support member 10, and further compressing the spring 28. While holding the dog 32 in the position as shown in FIG. 3, the operator may then in a single motion with the other hand place a bracing member over the dog and stud and still further compress the washer. (Alternatively, the operator may position the bracing member over the dog 32 and apply sufficient force to the bracing member to rotate the dog in a counter clockwise direction and compress the spring 28.) Once the bracing member further moves the washer 30 axially toward the support member 10 and further compresses the spring 28, the dog 32 may be released and will automatically return by gravity to its lock position. The subsequent release of the bracing member by the operator enables the biasing means to position the bracing member against the surface 60 of the dog, thus locking the bracing member in place.

If the bracing member were placed over the dog when positioned as in FIG. 3, and the operator did not thereafter forcefully press the bracing member against the washer before releasing the dog, but rather placed the paddle over the dog, the biasing force of the spring acting on the dog, in addition to gravity, would rotate the dog in the clockwise direction and expel the improperly placed bracing member from the stud. Thus, the safety of scaffolding has been substantially increased by the present invention, since the bracing member will either be properly locked in place or expelled from the stud to clearly indicate to both the person erecting the scaffolding and the user of the scaffolding that the bracing member is not connected to the support member.

Although it has been found that the embodiment as shown in FIG. 3 repeatedly functions in a satisfactory manner as described above, it might be possible when the dog was released for the portion 34 of the dog to engage the paddle 42 of the bracing member in such a manner that the force of the spring and gravity might not be able to cause the desired rotation of the dog to expel the bracing member. In order to reduce this possibility, the portion 34 of the dog may terminate as shown by the dash line 64 in FIG. 8, so thus as the dog rotates on the stud in a clockwise direction from the open position as shown in FIG. 3, the portion 34 does not substantially rise above the stud, and therefore the portion 34 would not engage the paddle when rotating between the open and locked positions. Even in this embodiment, a rounded end 66 may be provided which would function in the same manner as end 56.

Figure 9:
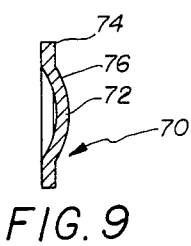
FIGS. 9 and 10 are each cross-sectional views of alternate embodiments of the washer shown in FIG. 7.

According to another embodiment of the present invention, the washer, or at least the transverse bar portion of the washer, could be bent or bowed. FIG. 9 depicts a cross-section of a washer as described herein, with the cross-sectional view being taken through the transverse bar portion of the washer. The bowed washer may be placed on the stud so that the transverse bar portion 72 was closer to the dog than the outer periphery 74 of the washer. An advantage of the embodiment depicted in FIG. 9 is that a curvilinear surface 76 of the transverse bar portion 72 of the washer is provided for engaging the dog when in the open position as shown in FIG. 3, so that the force being applied to the dog by the spring is redirected from a substantially horizontal force to an upwardly inclined force, which increases the rotational force on the dog compared to the embodiment previously described.

It has also been found that the spring 28 could be compressed as shown in FIG. 3 and the paddle only partially inserted on the stud. If the paddle and spring were thereafter released, the force of the spring acting on the dog in engagement with the washer 30 would generally pivot the dog downwardly, expelling the paddle from the stud. In some instances, however, frictional engagement between the washer 30 and the dog 36 and/or frictional engagement between the paddle 40 and the dog 36 may be insufficient to force the dog to rotate, i.e., the paddle could be pushed over the rivet 38 and be supported by the stud while the dog remains in the "open" position.

Figure 10:
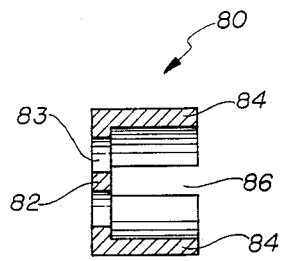

FIG. 10 depicts still another embodiment of a modified washer 80 according to the present invention. The base of the washer 80 may be fabricated in a manner similar to washer 30 or washer 70, with bar 82 designed for sliding in slot 43 and the apertures 83 corresponding to apertures 48 in FIG. 7. Protruding axially from the base of washer 80 (with respect to the axis of the stud) are two curvilinear wall portions 84 separated by slot 86. Each wall section 84 is substantially semi-cylindrical in configuration, with the inner diameter of the wall substantially conforming to the outer diameter of the stud. Slot 86 allows dog 36 to pivot within the washer 80 once the end of the dog clears bar 82. The washer may thus be retained on the stud, while the end surface 85 protrudes out past the end of the stud. The paddle is prevented from being placed over the stud by surface 85 unless the paddle forces the washer out of engagement with the dog. The washer 80 thus eliminates the possible problem referred to above.

It is a feature of the present invention that the stud terminates at a location substantially adjacent the axis of rotation of the dog. As shown in FIGS. 1 and 5, the stud does not substantially extend beyond the dog, even when the dog is in the lock position. In the locked position, the stud thus preferably does not extend substantially beyond the outer surface 62 of the dog, and thus the bracing member cannot be placed on the stud without first rotating the dog in the position as shown in FIG. 3. This feature adds to the safety of the present invention, since the bracing member cannot even temporarily be held in place by the stud without being locked in place.

Each of the components of the present invention may be fabricated from conventional metal stock. If desired, the washer or dog may be plated or otherwise coated with a suitable plastic to protect against corrosion and minimize frictional engagement of the components. The coil spring according to the present invention preferably applies a constant force of at least five pounds pressure on the washer. This force would increase to at least ten pounds of pressure when the dog was positioned as shown in FIG. 3.

Instead of being welded to the vertical member, the base of the stud could be otherwise temporarily or permanently secured to the vertical member, such as by riveting or threading. The slot in the stud is preferably vertically positioned with respect to the normally vertical support member, but a horizontal or inclined slot in the stud is within the concept of the present invention.

The term bracing member as used herein is intended to mean any member intended to be temporarily connected to a support member, and includes guard rails, cross members, and horizontal bracing members. The term support member as used herein is intended to mean any member intended to support a bracing member, and includes vertically positionable elongate members. As described herein, the connection and retention device 20 is preferably connected to the support member, although it could instead be connected to the bracing members and the support members provided with apertures to be placed over the stud.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. A scaffolding connection and retention device for temporarily securing together a first elongate support member and a second elongate bracing member, comprising:
   a stud affixed to said first member and having a longitudinal slot within a portion of the length of said stud;
   a dog member pivotally mounted to said stud and rotatable within said slot, said dog member having a washer engaging end and bracing member receiving end;
   a washer axially movable relative to said stud and having a transverse bar portion movable within said slot for engagement with said dog member;
   said washer engaging end of said dog member having an outer surface configuration for substantially line contact engagement between said washer engaging end and said washer when said dog member is pivotably rotated is alignment with said stud for receiving said bracing member; and
   a spring member substantially encompassing at least a portion of said stud and spaced between said first member and said washer for biasing said washer away from said first member and supplying at least a preselected biasing force on said dog member when positioned for receiving said bracing member.

2. The apparatus as defined in claim 1, wherein said dog member is pivotably mounted to said stud such that said bracing receiving end is normally positioned by gravity below said washer engaging end.

3. The apparatus as defined in claim 1, wherein said spring is a coil spring for applying a continuous force on said washer in excess of five pounds.

4. The apparatus as defined in claim 1, wherein said transverse bar portion of said washer engages said dog to prevent removal of said spring and said washer from said stud.

5. The apparatus as defined in claim 1, wherein said washer includes an axially projecting wall portion for preventing said bracing member from being supported by said stud unless said washer is forced out of engagement with said dog member.

6. The apparatus as defined in claim 1, wherein said first support member is vertically positioned and said longitudinal slot within said stud lies within a vertical plane.

7. The apparatus as defined in claim 1, wherein said outer surface configuration of said washer engaging end of said dog member for line contact engagement with said washer is substantially spaced from a central axis of said stud when said dog member is pivoted for receiving said bracing member.

8. The apparatus as defined in claim 7, wherein said washer engaging end is curvalinear and is spaced substantially above said central axis of said stud when said dog member is pivotably rotated in alignment with said stud.

9. The apparatus as defined in claim 1, wherein said stud further comprises:
  a base portion for fixed engagement with said first member; and
  an elongate rod portion having a substantially circular cross-sectional configuration protruding from said first member.

10. The apparatus as defined in claim 9, wherein the internal diameter of said washer is slightly greater than the external diameter of said elongate rod portion of said stud for preventing substantial non-axial movement of said washer relative to said stud.

11. The apparatus as defined in claim 9, wherein said elongate rod portion of said stud terminates at a point substantially adjacent the axis of rotation of said dog.

12. In a scaffolding having support members and bracing members, improved connection means comprising:
  a stud affixed to said first member including an elongate rod portion having a longitudinal slot within a portion of the length of said rod portion;
  a dog member pivotally mounted to said stud and rotatable within said slot;
  a washer axially movable relative to said stud and having a transverse bar portion movable within said slot for engagement with said dog member and having an axially projecting wall portion for preventing said bracing member from being supported by said stud unless said washer is forced out of engagement with said dog member; and
  a coil spring encompassing at least a portion of said stud and spaced between said first member and said washer for biasing said washer away from said first member.

13. The apparatus as defined in claim 12, wherein the internal diameter of said washer is slightly greater than the external diameter of said elongate rod portion of said stud for preventing substantial non-axial movement of said washer relative to said stud.

14. The apparatus as defined in claim 12, wherein said dog member comprises a rounded end for engagement with said washer when said dog member is pivoted for receiving said bracing member; and the point of engagement of said rounded end member and said washer is substantially spaced from the axis of said stud.

15. A scaffolding connection and retention device for temporarily securing together a first elongate vertically positioned support member and a second elongate bracing member, comprising:
  a stud having a base portion affixed to said first member and elongate rod portion having a circular cross-sectional configuration with a central axis protruding substantially horizontally from said first member, said rod portion further having a longitudinal slot lying within a vertical plane within a portion of the length of said rod portion;
  a dog member pivotally mounted to said stud and rotatable within said slot, said dog member having a washer engaging end and a bracing member receiving end;
  a washer axially movable relative to said stud and having a transverse bar portion within said slot for engagement with said dog member;
  said washer engaging end of said dog member is curvalinear for obtaining substantially line contact engagment with said washer when said dog member is pivoted for receiving said bracing member; and
  a coil spring encompassing at least a portion of said stud and spaced between said first support member and said washer for biasing said washer away from said first support member and supplying a least a preselected biasing force on said dog member when positioned for receiving said bracing member.

16. The apparatus as defined in claim 15, wherein said dog member is pivotably mounted to said stud such that said bracing receiving end is normally positioned by gravity below said washer engaging end.

17. The apparatus as defined in claim 15 wherein said coil spring applies a continuous force on said washer in excess of five pounds.

18. The apparatus as defined in claim 15, wherein the internal diameter of said washer relative to the external diameter of said elongate rod portion of said stud prevents substantial non-axial movement of said washer relative to said stud.

19. The apparatus as defined in claim 15, wherein said curvalinear end is spaced substantially above said central axis of said stud when said dog member is pivotably rotated in alignment with said stud.

20. The apparatus as defined in claim 15, wherein said elongate rod portion of said stud terminates at a point substantially adjacent the axis of rotation of said dog member.

21. A method for temporarily securing together scaffolding members including a support member, a bracing member, a stud having a central axis affixed to and protruding from said support member and a longitudinal slot within a portion of said stud, and a dog rotatably mounted to said stud and rotatable within said slot, comprising:
  providing a washer axially movable relative to said stud and having a transverse bar portion movable within said slot;
  rotating said dog relative to said stud from a lock position to a position for receiving said bracing member;
  inserting said bracing member on said stud;
  moving said bracing member axially toward said support member and past said dog;
  simultaneously applying a substantially axially directed biasing force to said bracing member opposing movement of said bracing member toward said support member;

applying a continuous biasing force to said dog while in said position to receive said bracing member for rotating said dog to said lock position while simultaneously restraining substantial rotation of said dog to said lock position; and releasing restraint on said dog to automatically return said dog to said locked position for preventing said bracing member from being expelled from said stud.

22. The method as defined in claim 21, wherein said biasing force applied to said bracing member is in excess of five pounds.

23. The method as defined in claim 21, further comprising:

providing stop means adjacent said stud for continuously preventing removal of said biasing force from said stud.

24. The method as described in claim 21, further comprising:

rounding a washer engaging end of said dog for obtaining substantially line contact engagement between said washer and said dog when said dog is rotated to receive said bracing member.

25. The method as defined in claim 24, further comprising:

spacing said rounded end of said dog for engagement with said washer at a position spaced above the axis of said stud when said dog is pivotally rotated to receive said bracing member.

* * * * *